UNITED STATES PATENT OFFICE.

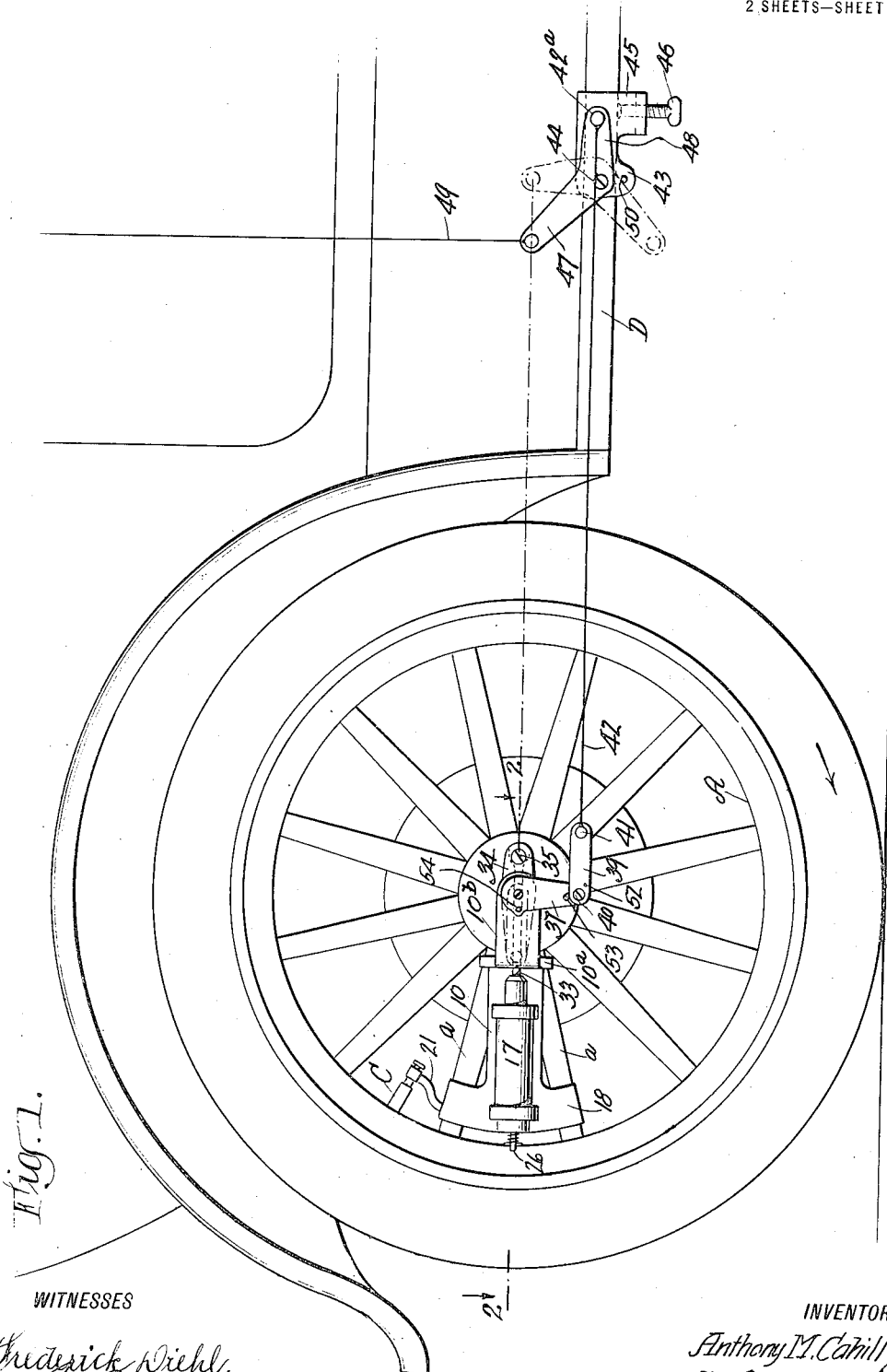

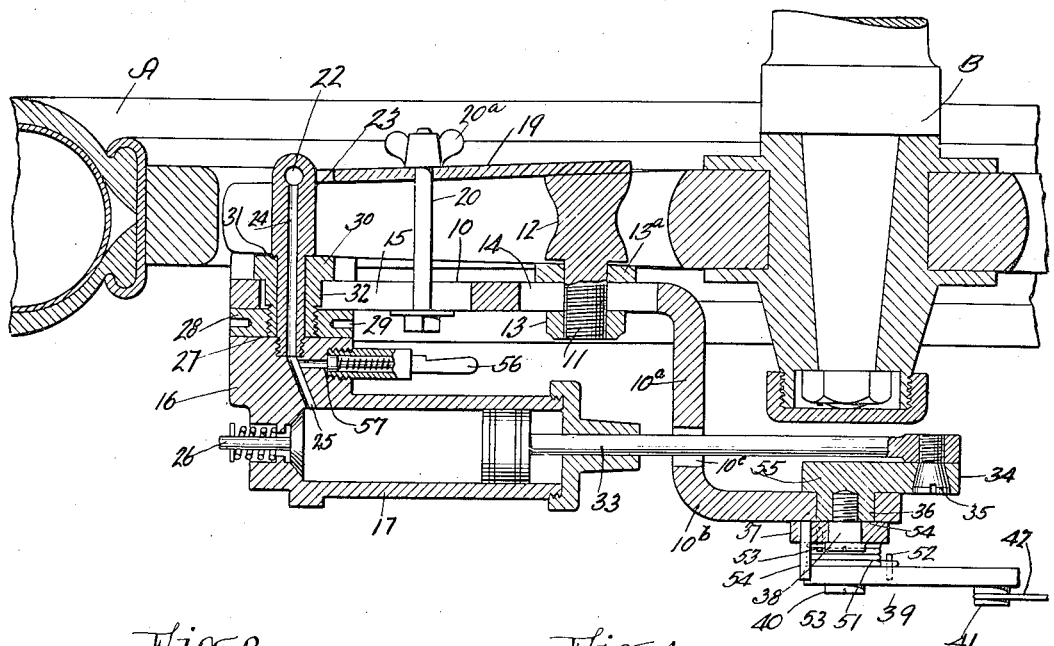
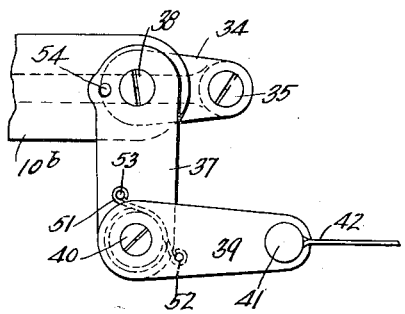
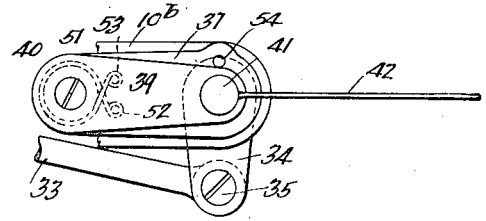
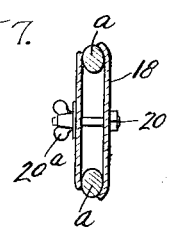
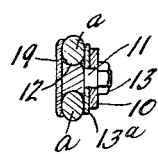
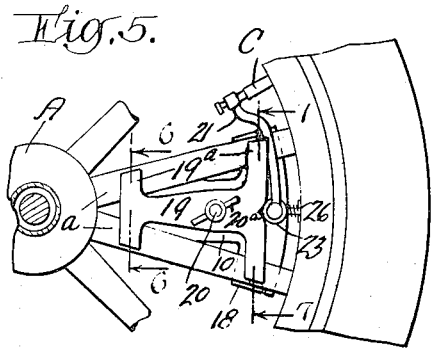

ANTHONY M. CAHILL, OF HIGHWOOD, CONNECTICUT.

TIRE-PUMP.

1,288,826.　　　　Specification of Letters Patent.　　Patented Dec. 24, 1918.

Application filed January 24, 1918.　Serial No. 213,548.

*To all whom it may concern:*

Be it known that I, ANTHONY M. CAHILL, a citizen of the United States, and a resident of Highwood, in the county of New Haven and State of Connecticut, have invented a new and Improved Tire-Pump, of which the following is a full, clear, and exact description.

My invention is mainly intended for embodiment in an automatic pump for the tires of automobiles and other vehicles, including aeroplanes, although not limited in all its phases to use in tire pumps.

In the preferred form of the invention it comprises elements adapted to be secured to a wheel whereby the pump may be quickly adjusted for the automatic operation by the turning of the wheel or to a position with the pump inoperative.

Objects of the invention are to provide a pump of the indicated character that may be readily applied to the spokes of a wheel; to provide a sufficient range of adjustment to conform to wheels and tires of varying sizes within reasonable limits; and to provide means to set the pump in action or to stop the same at will by the operator from the seat while the car is in motion and running even at full speed.

Other objects of the invention and the advantages of the distinctive features thereof will appear as the description proceeds.

Reference is to be had to the accompanying drawings forming a part of this specification in which similar reference characters indicate corresponding parts in all the views, it being understood that the drawings are merely illustrative of one example of the invention.

Figure 1 is a side elevation of a portion of an automobile equipped with my invention;

Fig. 2 is an enlarged horizontal section on the line 2—2, Fig. 1;

Fig. 3 is a fragmentary side view given to show certain pump operating and controlling elements in the positions occupied thereby when the pump is in action;

Fig. 4 is a side view of the parts shown in Fig. 3, but showing the positions thereof when the pump is out of action;

Fig. 5 is a fragmentary side view of the attachment applied to the wheel and looking at the opposite side from that shown in Fig. 1;

Figs. 6 and 7 are respectively detail views in cross section on the lines 6—6, 7—7, Fig. 5.

In carrying out my invention in accordance with the illustrated example a yoke bracket 10 is provided to be applied to adjacent spokes *a* of a wheel A and the inner end of the bracket is bent twice at right angles as at $10^a$, $10^b$, so that the offset portion $10^b$ is disposed in front of the axle B and therefore a line drawn coincident with the axis of revolution of the wheel will pass through said offset end. The bracket is secured to the wheel adjacent to the hub by a stud 11, the stud being grooved as at 12 to be wedged between the convergent inner ends of the two spokes. The stud is threaded to receive a nut 13 so that the bracket 10 is clamped between said nut and the shoulder presented by the head 12 at the base of the threaded shank of the stud, a washer $13^a$ being usually employed. The stud passes through an elongated slot 14 in the bracket. A second slot 15 is formed in the bracket outward from the slot 14 to adjustably accommodate the means for fastening the base 16 of the pump cylinder 17. The yoke of the bracket 10 comprises suitable clamp members, there being, in the illustrated example, a rigid transverse clamp element 18 at the outer end of the bracket and a coacting clamp plate or bar 19 at the opposite side of the spokes from the element 18, and presenting lateral arms $19^a$ to bear against the spokes, the clamp being completed by a bolt 20 and nut $20^a$. The engagement of the stud 11 and clamp element 18 serves to wedge the bracket 10 in position on the wheel to hold the bracket in position without any tendency to shift and without employing any permanent attaching elements on the wheel itself, the ordinary parts of the wheel being availed of.

The numeral 21 indicates a piece of the pipe or hose extending from the tire valve C, to a transverse port 22 in a fitting 23, there being a longitudinal port 24 in the said fitting communicating with the discharge port 25 of the pump cylinder 17. The numeral 26 indicates the inlet valve of the pump. The fitting 23 is threaded at its extreme end as at 27 into the pump base 16. The collar 30 is loosely fitted on the fixture 23 and at one side bears against a shoulder 31 thereon. Said collar 30 has a reduced neck 32 received in the slot 15, the shoulder produced by the reduced neck coming to a bearing against the yoke bracket 10 at one side while the nut 28 on the threaded end of the neck 32 is adapted to be tightened against the opposite side of the bracket, said nut being suitably formed to receive a wrench, there being recesses 29 shown for the purpose. Thus, the fitting 23 may have a swiveled or turning movement in collar 30 which is clamped fast to the bracket.

The rod 33 of the pump piston extends through an opening 10ᶜ in the lateral bend 10ᵃ of the bracket 10 and the outer end of the piston is secured by a wrist pin 35 to a crank 34. Said crank has a hub 36 extending outwardly through the offset portion 10ᵇ of the bracket, the hub being in alinement with the axis of revolution of the wheel. To the outer end of the hub 36 is secured by a screw 38 or the like a second crank 37 disposed at an angle of 90° or approximately so to the crank 34.

I provide a shifting mechanism, the operation of which throws the pump into or out of action, without the employment of change gears or shifting clutches. Said mechanism comprises a means under the control of the operator from his seat in the car to hold the crank 37 against turning movement to thereby hold the crank 34 in a fixed position with the wrist pin 35 of the piston rod 33 similarly in a fixed location, whereby to cause a relative movement of the piston and cylinder, the shifting mechanism being adapted, on the other hand, to be so adjusted as to permit the cranks to turn with the wheel and without relative movement of the piston and cylinder to thereby maintain the pump out of action. In the illustrated form the shifting mechanism includes a connecting rod or swingable arm 39 which is pivoted at one end as at 40 to the outer end of the crank 37, and has connected to its opposite end a rod or wire 42 as by a knob or pin 41 on the connecting rod to which the wire 42 is loosely secured. Said wire 42 extends to a shifting lever 43 fulcrumed as at 44 between its ends on an element attachable to the automobile and advantageously to the running board D. In the illustrated form a block 45 is adapted to be secured by a clamp screw 46 to the running board. The lever 43 comprises two arms 47, 48 to one of which is connected the wire 42 and to the other arm (48) is secured an operating wire 49, which in practice will extend to a point convenient to the driver's seat (not shown). The numeral 50 indicates a stop pin to limit the movements of the lever 43.

The arm or connecting rod 39 is spring-pressed, being subject to the tension of a suitable spring 51, the spring in the illustrated form being coiled about the screw or pin 40 and having its ends, respectively, secured to pins 52, 53 on the connecting rod 39 and crank 37 so that the spring normally tends to maintain said connecting rod 39 in line with the crank 37.

With the described shifting mechanism if the lever 43 is in the full line position of Fig. 1 and the position of Figs. 2 and 3, the wire 42 and connecting rod 39 hold the crank 37 against turning movement and thus hold also immovable the crank 34 which is in rigid relation to the crank 37, whereby the wrist pin 35 will be maintained in a given location as shown, Figs. 1, 2 and 3. Since said location is at a side of the axis of revolution of the wheel, the carrying of the pump cylinder 17 around with the wheel will cause a relative movement of the pump and piston. If, on the other hand, the lever 43 is shifted to the dotted line position of Fig. 1 and the position of Fig. 4, with the cranks free to turn, the crank 37 and connecting rod 39 will be brought together by a relative swinging of the said connecting rod on its pivot 40 until the point of connection 41 of the wire 42 is coincident with the axis of revolution of the wheel and therefore in line with the hub 36 of the crank arm 34, thereby permitting the cranks to turn with the wheel and pump so that there will be no relative movement of the cylinder and piston.

A stop pin 54 on the crank 37 limits the swinging movement of the connecting rod 39 under the action of the spring 51 to maintain the pins 41 and 38 in axial alinement.

The numeral 56 indicates a whistle of known form constituting an audible signal when a given pressure is reached by the pump and tire, the whistle communicating by a port 57 with the discharge port 45 of the pump.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A pump including a cylinder, a piston therein, a piston rod, a crank to which the rod is connected, means to mount the pump for turning movement about the axis of the crank, a second crank rigid with the first crank and at an angle thereto, said cranks being coaxial, an element pivoted at the outer end of the second crank to swing through an arc for disposing said element at an angle to the second crank, or to a position lying against the latter, and shifting means for said element, said shifting means being connected with the said element near the free end thereof at a point to bring the connection between the said element and said shifting means coaxial with the cranks or out of axial alinement therewith.

2. A pump including a cylinder, a piston operating therein, a piston rod, a crank to which the piston rod is connected, means to mount the pump for turning movement about the axis of the crank, a second crank rigid with and at an angle to the first crank and coaxial therewith, and optionally controllable means connected with the second crank and adapted to hold the same against turning with the pump or to release the cranks for turning with the pump.

3. A pump including a cylinder, a piston operating therein, a piston rod, a crank to which the piston rod is connected, means to mount the pump for turning about an axis coincident with the axis of the crank, a second crank rigid with and at an angle to the first crank and coaxial therewith, an element swingably connected at one end to the outer end of the second crank and adapted to be moved to bring its free end in line with the axis of the cranks or to a position at an angle to the second crank, a spring tending to hold said element in the first mentioned position, and means to shift said element to the other position against the tension of the spring.

4. A pump including a cylinder, a piston operating therein, a piston rod, a crank to which the piston rod is connected, means to mount the pump for turning about an axis corresponding with the axis of the crank, a second crank rigid with and at an angle to the first crank and coaxial therewith, an element swingably connected at one end to the outer end of the second crank and adapted to be moved to bring its free end in line with the axis of the cranks or to a position at an angle to the second crank, means to hold said element in the first mentioned position, and means to shift said element to the other position, said shift means comprising a lever, means to throw said lever, and a connection between said lever and the free end of said swingable element.

5. In a pump of the class described, a bracket having an offset end, means to secure the bracket to a wheel with its offset end in line with the axis of revolution of the wheel, a pump cylinder carried by said bracket, a piston in said cylinder, a piston rod, a crank carried by the offset end of the bracket and adapted to turn therein, a connection between said crank and the piston rod, and means to hold the crank against turning with the pump and bracket or to permit the turning of the same with the pump and bracket.

6. A pump of the class described including a bracket, means to secure the bracket to a wheel, a pump mounted on the bracket, and means to cause the operation of the pump by the turning of the bracket with the wheel, the said bracket-securing means comprising a stud on the bracket and adapted to be wedged between the convergent inner ends of adjacent spokes of the wheel.

7. A pump of the class described including a bracket, means to secure the bracket to a wheel, a pump mounted on the bracket, and means to cause the operation of the pump by the turning of the bracket with the wheel, the said bracket-securing means comprising a stud adjustable on the bracket relatively to the inner end thereof and adapted to be wedged between the convergent inner ends of the adjacent spokes of the wheel; together with means adjustable on the bracket outward from said stud, said pump including a cylinder adjustable with the last mentioned means.

8. A pump of the class described including a bracket, means to secure the bracket to a wheel, a pump cylinder mounted on the bracket, a piston operating in the cylinder, means on the said bracket and connected with the piston to cause the operation of the pump by the turning of the bracket with the wheel, a fixture at the base of the pump cylinder having a port in communication with said cylinder, means to connect said port with a tire valve, and means to simultaneously adjust the pump cylinder and fixture on the bracket.

ANTHONY M. CAHILL.